US010752249B2

(12) United States Patent
Leonard et al.

(10) Patent No.: US 10,752,249 B2
(45) Date of Patent: Aug. 25, 2020

(54) VEHICLE SYSTEMS AND METHODS FOR PROVIDING TURN ASSISTANCE AT AN INTERSECTION

(71) Applicant: Toyota Research Institute, Inc., Los Altos, CA (US)

(72) Inventors: John J. Leonard, Newton, MA (US); Stephen G. McGill, Broomall, PA (US); Luke S. Fletcher, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 150 days.

(21) Appl. No.: 15/921,027

(22) Filed: Mar. 14, 2018

(65) Prior Publication Data

US 2019/0283756 A1  Sep. 19, 2019

(51) Int. Cl.
*B60W 30/18* (2012.01)
*G06K 9/00* (2006.01)
(Continued)

(52) U.S. Cl.
CPC ...... *B60W 30/18145* (2013.01); *B60W 30/09* (2013.01); *B60W 40/09* (2013.01); *G01C 21/3629* (2013.01); *G01C 21/3667* (2013.01); *G01C 21/3691* (2013.01); *G05D 1/0055* (2013.01); *G05D 1/0088* (2013.01); *G05D 1/0246* (2013.01); *G05D 1/0255* (2013.01);
(Continued)

(58) Field of Classification Search
CPC ..... G01S 2013/9353; G01S 2013/9357; G01S 2013/936; G01S 17/023; G01S 17/89; B60W 50/14; B60W 40/00; B60W 30/18154
See application file for complete search history.

(56) References Cited

U.S. PATENT DOCUMENTS

| 7,990,286 B2 | 8/2011 | Shankwitz et al. | |
| 8,482,431 B2 * | 7/2013 | Kushi | G08G 1/164 340/425.5 |

(Continued)

FOREIGN PATENT DOCUMENTS

| CN | 102725610 | 10/2016 | |
| WO | WO2019172938 A1 * | 9/2019 | G06F 17/10 |

*Primary Examiner* — Anne Marie Antonucci
*Assistant Examiner* — Sahar Motazedi
(74) *Attorney, Agent, or Firm* — Dinsmore & Shohl LLP (57) ABSTRACT

Vehicle systems and methods for assisting a driver making a turn at an intersection are disclosed. In one embodiment, a vehicle includes a plurality of sensors configured to output a plurality of operational signals, one or more processors, and one or more non-transitory memory modules communicatively coupled to the one or more processors. The processors store machine-readable instructions that, when executed, cause the one or more processors to receive a signal indicating a driver of the vehicle is attempting to make a turn at an intersection. The processors are further caused to access a behavioral profile that is representative of the intersection. The processors are also caused to develop a perception as well as a risk associated with the intersection based on the plurality of operational signals from the plurality of sensors and the behavioral profile of the intersection. The processors are further caused to calculate at least one maneuver.

20 Claims, 3 Drawing Sheets (51) Int. Cl.
*G05D 1/00* (2006.01)
*G01C 21/36* (2006.01)
*G05D 1/02* (2020.01)
*B60W 40/09* (2012.01)
*B60W 30/09* (2012.01)
*G07C 5/08* (2006.01)

(52) U.S. Cl.
CPC ......... *G05D 1/0257* (2013.01); *G05D 1/0278* (2013.01); *G06K 9/00805* (2013.01); *G06K 9/00845* (2013.01); *B60W 2400/00* (2013.01); *B60W 2540/00* (2013.01); *B60W 2556/00* (2020.02); *B60Y 2200/11* (2013.01); *B60Y 2300/09* (2013.01); *G05D 2201/0213* (2013.01); *G07C 5/08* (2013.01)

(56) References Cited

U.S. PATENT DOCUMENTS

| | | | | |
|---|---|---|---|---|
| 8,577,550 B2 * | 11/2013 | Lu | .................. | B60W 10/06 |
| | | | | 340/435 |
| 8,892,356 B1 * | 11/2014 | Weiland | ............. | G01C 21/3658 |
| | | | | 701/431 |
| 9,091,558 B2 | 7/2015 | Su et al. | | |
| 9,099,006 B2 * | 8/2015 | Mudalige | .............. | B60W 10/00 |
| 9,594,373 B2 * | 3/2017 | Solyom | ................ | G05D 1/0212 |
| 9,649,979 B2 * | 5/2017 | Sakai | ..................... | B60Q 9/008 |
| 9,688,273 B2 * | 6/2017 | Mudalige | .............. | B60W 30/08 |
| 9,751,506 B2 * | 9/2017 | Mudalige | .............. | G08G 1/166 |
| 9,937,929 B2 * | 4/2018 | Wulf | ..................... | B60W 40/08 |
| 2005/0012602 A1 * | 1/2005 | Knoop | .................. | B60Q 9/008 |
| | | | | 340/435 |
| 2008/0015772 A1 | 1/2008 | Sanma et al. | | |
| 2009/0237269 A1 * | 9/2009 | Okugi | ....................... | B60R 1/00 |
| | | | | 340/901 |
| 2012/0005209 A1 * | 1/2012 | Rinearson | .............. | G06Q 30/02 |
| | | | | 707/737 |
| 2015/0213712 A1 | 7/2015 | Keller | | |
| 2015/0362327 A1 * | 12/2015 | Weiland | ................. | G01C 21/32 |
| | | | | 701/532 |
| 2016/0027299 A1 * | 1/2016 | Raamot | ................ | G08G 1/08 |
| | | | | 340/917 |
| 2016/0185347 A1 * | 6/2016 | Lefevre | ................. | B60W 30/09 |
| | | | | 701/301 |
| 2017/0124407 A1 * | 5/2017 | Micks | ........................ | G06T 7/20 |
| 2017/0166124 A1 * | 6/2017 | Nakagawa | ............ | B60Q 9/008 |
| 2017/0287338 A1 * | 10/2017 | Neubecker | ................ | B60R 1/00 |
| 2018/0053093 A1 * | 2/2018 | Olabiyi | ................. | G06N 3/0454 |
| 2018/0190111 A1 * | 7/2018 | Green | .................. | G08G 1/0145 |
| 2018/0231974 A1 * | 8/2018 | Eggert | ............. | B60W 30/0956 |
| 2018/0259957 A1 * | 9/2018 | Charrow | ................ | G08G 1/166 |
| 2018/0308360 A1 * | 10/2018 | Regmi | ................ | G08G 1/0965 |
| 2018/0374360 A1 * | 12/2018 | Miao | .................. | G06K 9/00791 |
| 2019/0018419 A1 * | 1/2019 | Lee | ................. | B60W 30/18154 |
| 2019/0196485 A1 * | 6/2019 | Li | ......................... | G05D 1/0223 |

* cited by examiner

VEHICLE SYSTEMS AND METHODS FOR PROVIDING TURN ASSISTANCE AT AN INTERSECTION

TECHNICAL FIELD

Embodiments described herein generally relate to vehicles and, more specifically, to vehicles that assist a driver attempting to make a turn at an intersection.

BACKGROUND

Some intersections may be especially challenging for a driver to navigate. More specifically, it may be difficult for a driver to analyze traffic and determine when it is appropriate to make a turn maneuver. Heavy cross-traffic volumes, high speeds, and limited visibility due to obstructions along a street may inhibit a driver's ability to judge suitable gaps in traffic for turning maneuvers. Some intersections that are not particularly challenging may still cause anxiety for less skilled or inexperienced drivers who have difficulties analyzing traffic and determining when it is appropriate to make a turn. For example, teenagers and some senior citizens may become nervous or frustrated when attempting to make a turn at an intersection.

Additionally, some drivers are simply not confident in their driving abilities and may hesitate when attempting to make a turn at an intersection. This hesitation may be an issue in metropolitan areas such as New York City or Los Angeles, as urban drivers tend to be aggressive and may not use their turn signals or yield to traffic.

SUMMARY

In one embodiment, a vehicle includes a plurality of sensors configured to output a plurality of operational signals, one or more processors, and one or more non-transitory memory modules communicatively coupled to the one or more processors. The processors store machine-readable instructions that, when executed, cause the one or more processors to receive a signal indicating a driver of the vehicle is attempting to make a turn at an intersection. The processors are further caused to access a behavioral profile that is representative of the intersection. The processors are also caused to develop a perception as well as a risk associated with the intersection based on the plurality of operational signals from the plurality of sensors and the behavioral profile of the intersection. The processors are further caused to calculate at least one maneuver to be performed by one or more vehicle systems of the vehicle based at least in part on at least one of the perception of the driver and the risk of the intersection.

In yet another embodiment, a method includes receiving a signal indicating a driver of a vehicle is attempting to make a turn at an intersection. The method further includes accessing, by a computer, a behavioral profile that is representative of the intersection. The method also includes developing a perception as well as a risk associated with the intersection based on a plurality of operational signals from a plurality of sensors and the behavioral profile of the intersection. Finally, the method includes calculating at least one maneuver to be performed by one or more vehicle systems of the vehicle based at least in part on at least one of the perception of the driver and the risk of the intersection.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein are directed to vehicle systems and methods that determine when a driver is attempting to make a turn at an intersection, determine a perception and a risk associated with the intersection, and calculate at least one maneuver to be performed based at least in part on the perception and the risk of the intersection.

As described in detail below, embodiments of the present disclosure assist a driver in performing a turn at an intersection. Embodiments of the present disclosure may first determine that the driver is attempting to make a turn at an intersection. The vehicle system may determine that the driver is about to make the turn based on actions such as, but not limited to, activation of a turn signal, a direction of the driver's gaze, or the position of a steering wheel. In one embodiment, the system may determine the driver is about to make a turn based on map data. In response to determining the driver is attempting to make a turn, the vehicle control system then determines a risk associated with the intersection, a perception associated with the driver, and a perception of the vehicle. The perception of the driver may be used to determine if the driver is distracted, and the risk is used to determine if is likely that the vehicle may contact another vehicle, be driven off the road, or another undesirable outcome.

The perception and risk may be used to determine at least one maneuver to be performed by one or more vehicle systems in order to turn the vehicle through the intersection. More specifically, the system may determine that semi-autonomous control of the vehicle is necessary based on the perception and risk. Accordingly, one or more maneuvers are performed semi-autonomously by a vehicle system such as, but not limited to, a transmission system, a throttle system, a braking system, a semi-autonomous driving system, a lane-keeping assist system, a parking assist system, a steering system, a navigation system, an infotainment system, and the like. Thus, in one embodiment the vehicle control system may instruct a semi-autonomous driving system to control the steering system and the throttle system in order to maneuver the vehicle through the intersection.

In another embodiment of the present disclosure, the vehicle control system may provide instructions that indicate how the vehicle should be maneuvered through the intersection. For example, in one embodiment the vehicle control system may provide a visual, auditory, or haptic indictor that instructs the driver to make a turn. More specifically, the vehicle may display a message that states "It is OK to now turn" or "Turn now". In yet another embodiment, the vehicle may display a message that provides specific instructions to the driver as how to maneuver the vehicle. For instance, the vehicle may display a message that states "Turn left quickly now" or "Turn at an accelerated speed". In another example, the message may warn the driver of an impending obstacle or other event requiring attention such as "Watch out for the pedestrian crossing the street" or "Be careful, the intersection is slippery due to ice".

Various embodiments of vehicles and methods for assisting a driver attempting to make a turn through an intersection are disclosed below.

Figure 1:
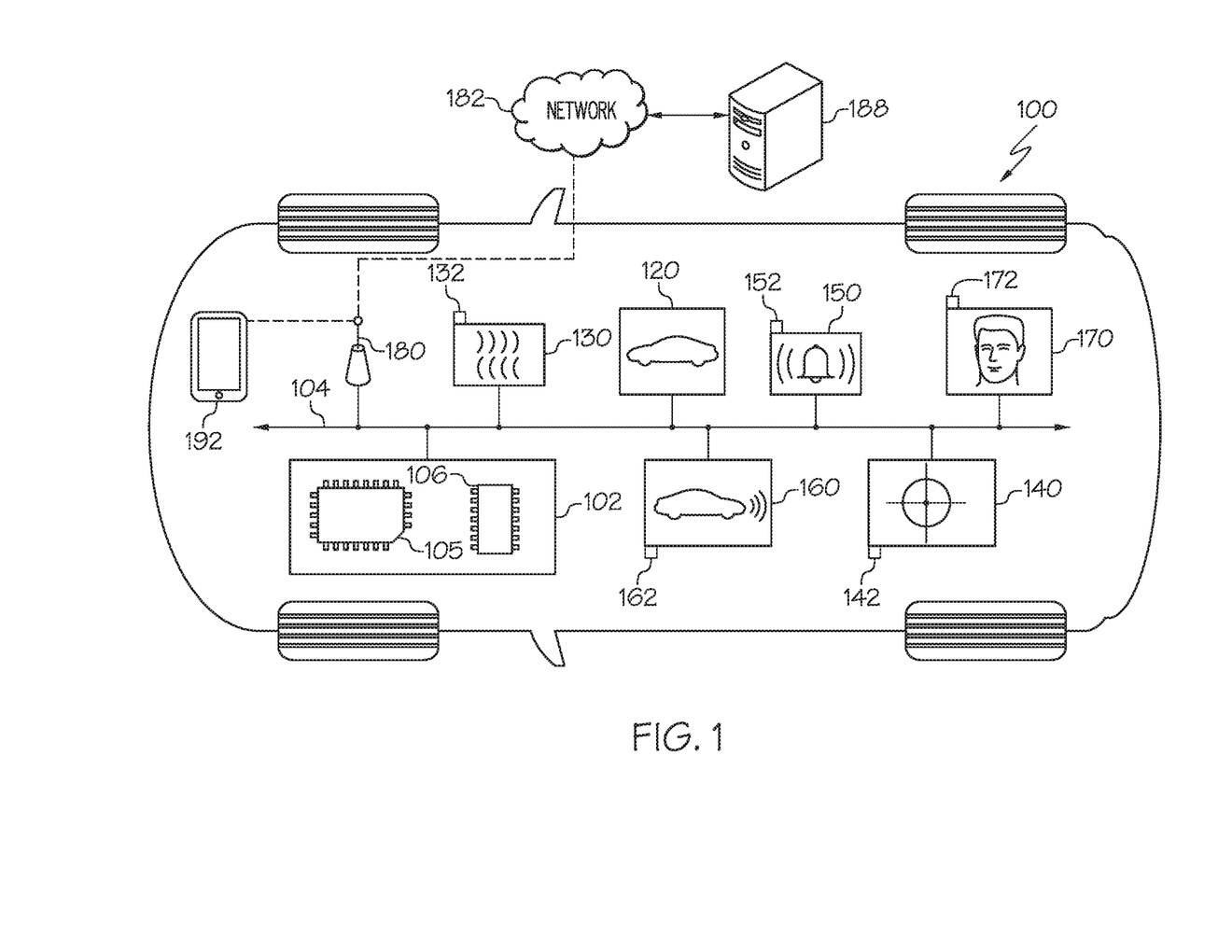
FIG. 1 depicts a schematic view of an example vehicle configured to assist a driver attempting to make a turn, according to one or more embodiments shown and described herein.

Referring now to FIG. 1, an embodiment of a vehicle 100 is schematically depicted. The vehicle 100 may be any passenger vehicle such as, for example, a terrestrial, aquatic, and/or airborne vehicle. The vehicle 100 includes an electronic control unit 102, a communication path 104, a semi-autonomous control system 120, an object detection system 130, a location determination system 140, a notification system 150, a vehicle operating condition sensor system 160, a driver detection system 170, and a wireless communication system 180. The electronic control unit 102 includes one or more processors 105 and one or more memory modules 106.

As explained in greater detail below, the electronic control unit 102 is configured to determine when a driver of the vehicle 100 is attempting to make a turn through an intersection based on one or more signals generated by at least one of the driver detection system 170, the location determination system 140, and the vehicle operating condition sensor system 160. The electronic control unit 102 may then calculate at least one maneuver to guide the vehicle through the intersection based on a perception of the driver, the perception of the vehicle, and the risk associated with the intersection. The electronic control unit 102 may then determine at least one maneuver to be performed by one or more vehicles systems in order to avoid the detected object or be driven off the road.

As explained in greater detail below, the perception of the driver and the perception of the vehicle are based on a behavioral profile associated with the intersection and data gathered by a plurality of sensors of the vehicle. The behavioral profile includes one or more characteristics that are representative of the intersection, and the sensors indicate conditions at the intersection such as visibility, cross-traffic, obstructions, driver attentiveness, and the like.

In one embodiment, the electronic control unit 102 may issue one or more notifications using the notification system 150 informing the driver of the maneuver that is calculated. In addition or alternatively, the electronic control unit 102 may take semi-autonomous control of the vehicle 100 using the semi-autonomous control system 120 to perform the calculated maneuver. That is, the maneuver may be performed semi-autonomously by one or more vehicle system such as, but not limited to, a transmission system, a throttle system, a braking system, an semi-autonomous driving system, a lane-keeping assist system, a parking assist system, a steering system, a navigation system, an infotainment system, and the like.

Continuing to refer to FIG. 1, the communication path 104 provides data interconnectivity between various modules disposed within the vehicle 100. Specifically, each of the modules may operate as a node that may send and/or receive data. In some embodiments, the communication path 104 includes a conductive material that permits the transmission of electrical data signals to processors, memories, sensors, and actuators throughout the vehicle 100. In some embodiments, the communication path 104 can be a bus, such as, for example, a LIN bus, a CAN bus, a VAN bus, and the like. In some embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 1, the electronic control unit 102 may be any computing device. For instance the electronic control unit 102 may be any type of vehicle-installed, handheld, laptop, or other form of single computing device, or may be composed of multiple computing devices. The electronic control unit 102 includes one or more processors 105 for controlling operations of the electronic control unit 102. The one or more processors 105 may include any device capable of executing machine-readable instructions stored on a non-transitory computer-readable medium. Accordingly, each of the one or more processors 105 may include a controller, an integrated circuit, a microchip, a computer, and/or any other computing device.

The electronic control unit 102 further includes one or more memory modules 106 communicatively coupled to the one or more processors 105. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 may include, for example, object recognition logic, speech recognition logic, risk determination logic, notification generation logic, and semi-autonomous vehicle control logic. Thus, the electronic control unit 102 includes logic to receive signals indicating the driver is attempting to make a turn at an intersection, determine the risk and perception of the intersection, and determine one or more maneuvers to be performed by the vehicle 100 to turn through the intersection.

As noted above, the logic stored on the one or more memory modules 106 may include object recognition logic. The object recognition logic may include any known or yet-to-be-developed object recognition algorithms that may be utilized to detect objects within an environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like). The logic stored on the electronic control unit may also include speech recognition logic used to detect the words spoken by the driver and/or passengers within the vehicle 100. Any known or yet-to-be-developed speech recognition algorithms may be used for the speech recognition logic.

In the embodiments described herein, the one or more memory modules 106 and the one or more processors 105 are integral with the electronic control unit 102. However, it is noted that the electronic control unit 102, the one or more memory modules 106, and the one or more processors 105 may be discrete components communicatively coupled to one another without departing from the scope of the present disclosure. As an example and not a limitation, one or more processors and one or more memory modules 106 of the electronic control unit 102 may be remote to the vehicle 100. For example, the vehicle 100 may be in wireless communication (e.g., using a wireless communication system) with a remote server storing logic and data that is configured to perform at least some of the functionalities described herein.

The object detection system 130 is communicatively coupled to the electronic control unit 102 over the communication path 104. The object detection system 130 may include any device configured to detect the presence of an object within the vicinity of the vehicle 100. The object detection system 130 may include an object detection sensor 132. The object detection sensor 132 may be configured to output an output signal indicative of the presence of one or more objects within a vicinity of the intersection. Based on the output signal of the object detection sensor 132, the electronic control unit 102 may execute object recognition logic to detect an object and classify the detected object into a classification. The object detection sensor 132 may include, but is not limited to, a camera, a LiDAR sensor, a RADAR sensor, a sonar sensor, a proximity sensor, and the like. In some embodiments, the object detection system 130 includes more than one object detection sensor 132.

Figure 2:
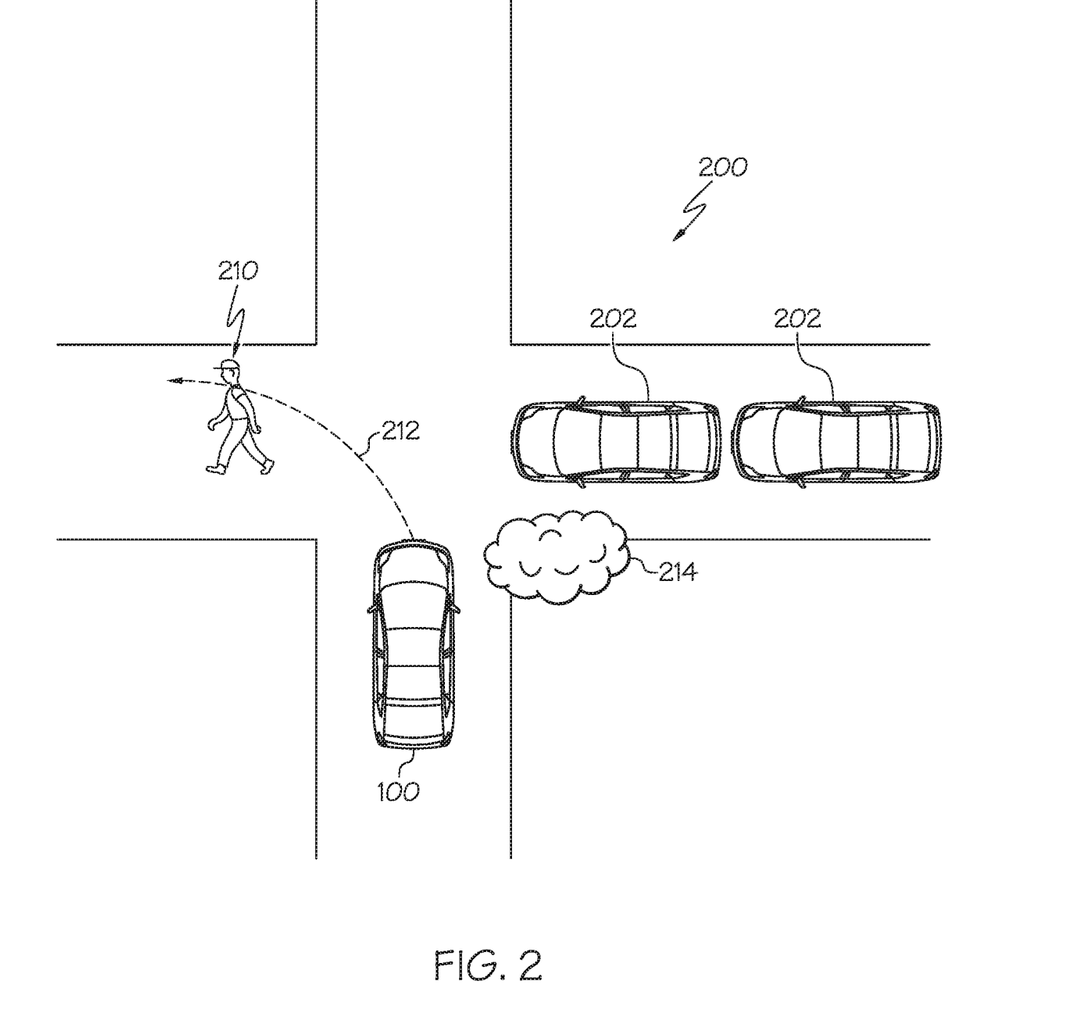
FIG. 2 depicts a schematic view of an example intersection that the vehicle shown in FIG. 1 is attempting to turn through, according to one or more embodiments shown and described herein.

Referring now to both FIGS. 1 and 2, the object detection system 130 is configured to detect the presence of objects located within or around the vicinity of an intersection 200. More specifically, the object detection system 130 may determine the presence of one or more vehicles 202 stopped at the intersection as well as any cross-traffic through the intersection 200. Although vehicles are illustrated in FIG. 2, it should be appreciated that the object detection system 130 is not limited to only detecting vehicles. For example, in the embodiment as shown in FIG. 2, the object detection system 130 may detect obstacle 210 located along a predicted trajectory 212 of the vehicle 100 through the intersection 200, where the obstacle 210 is a pedestrian. Although FIG. 2 illustrates a pedestrian, the obstacle 210 may be any other object such as, for example, an animal, debris upon the road, a bicyclist, and the like.

In addition to obstacles 210 located within the intersection, the object detection system 130 may also detect occlusions that may block or otherwise inhibit the view of vehicles or other objects that are approaching the intersection 200. For instance, FIG. 2 also illustrates an occlusion 214 that blocks the view of cross-traffic along a right-hand side of the intersection 200. In the example as illustrated the occlusion 214 is shrubbery. However, other occlusions may include, but are not limited to, a parked car, a hill, a building, a snow bank, and the like. In one embodiment, the occlusion may represent weather conditions that affect visibility such as, for example, fog, rain, snow, and the like.

Referring to FIG. 1, the semi-autonomous control system 120 is communicatively coupled to the electronic control unit 102 over the communication path. The semi-autonomous control system 120 is configured to produce control signals to various vehicle hardware systems to perform semi-autonomous control of one or more vehicle functions. As non-limiting examples, the semi-autonomous control system 120 is configured to send control signals to a braking system, a steering system, and a throttle system of the vehicle to semi-autonomously or fully control the vehicle 100 as appropriate.

The vehicle 100 may be driven based on both human input and computer-assisted control (e.g., lane keeping assist, adaptive cruise control, collision avoidance, and the like). In contrast, an autonomously controlled vehicle navigates the environment without human input. For instance, if the disclosed system determines the driver is attempting to make a turn at an intersection based on a position of a steering wheel while the vehicle 100 is operating in the semi-autonomous driving mode, then the driver may control certain aspects of the vehicle operation, such as steering, while the electronic control unit controls other aspects of the vehicle operation, such as braking and acceleration. It is to be appreciated that the vehicle 100 operates in the present disclosure in a semi-autonomous driving mode when the semi-autonomous control system 120 is guiding the vehicle 100 through an intersection. It should also be appreciated that when the driver approaches the intersection, the vehicle 100 is being controlled based on only human input. Driving the vehicle 100 based on human input may be referred to as manual control.

The location determination system 140 is communicatively coupled to the electronic control unit 102 over the communication path 104. The location determination system 140 may include any device configured to determine a location of the vehicle 100. In one embodiment of the present disclosure, the location determination system 140 may determine the routes of various roadways that the vehicle 100 may travel upon as well as static objects such as stores, lampposts, signs, crosswalks, and other objects.

The location determination system 140 may include a location sensor 142 configured to output an output signal indicative of the location of the vehicle 100. Based on the output signal of the location determination system 140, the electronic control unit 102 may execute logic to determine a vehicle location. The location sensor 142 may include, but is not limited to, a camera, a GPS unit, and the like. In embodiments where the location sensor 142 includes a camera, the electronic control unit 102 may execute object recognition logic to determine based on objects within the environment of the vehicle 100, the location of the vehicle 100. For example, the one or more processors 105 of the electronic control unit 102 may execute object recognition logic, such that the electronic control unit 102 may read signs and/or recognize objects that may indicate a location of the vehicle 100 (e.g., on ramps, highways, sidewalks, storefronts, houses, and the like).

The notification system 150 is communicatively coupled to the electronic control unit 102 over the communication path 104. The notification system 150 may include any notification device 152 configured to provide instructions to the driver as to how the vehicle 100 is to be maneuvered through an intersection. The notification device 152 may include, but is not limited to, a tactile feedback device, a vehicle speaker, a display, and the like. For example, the notification system 150 may activate a haptic steering wheel to provide a lane departure warning. Alternatively, an audio or visual lane departure warning may be provided by the notification system 150 instead.

The vehicle operating condition sensor system 160 is communicatively coupled to the electronic control unit 102 over the communication path 104. The vehicle operating condition sensor system 160 may include any device configured to detect one or more operating conditions of the vehicle 100. For example, the vehicle operating condition sensor system 160 may detect vehicle speed, direction, acceleration, braking, position of the steering wheel, and the like. As such, the vehicle operating condition sensor system 160 may include an operation condition sensor 162 configured to output an operational signal indicative of one or more operations of the vehicle 100. The operation condition sensor 162 may include, but is not limited to, a speed sensor, an acceleration sensor, a braking sensor, a steering angle sensor, and the like. In some embodiments, the operation condition sensor 162 may be a GPS unit, wherein a speed of the vehicle 100 is determined from an output of the GPS unit. In one embodiment, the vehicle operating condition may indicate that one of the turn signal blinkers has been activated. Activating one of the turn signal blinkers may indicate that the driver is attempting to make a turn if the vehicle 100 is positioned near an intersection.

The driver detection system 170 is communicatively coupled to the electronic control unit 102 over the communication path 104. The driver detection system 170 may include any device configured to detect the presence, movements and/or actions of the driver of the vehicle 100. As such, the driver detection system 170 may include one or more driver detection sensors 172. The driver detection sensors 172 may include, but are not limited to, a gaze detection sensor, such as a camera with a field of view on a face of the driver. The gaze detection sensor is configured to output a gaze signal indicative of a gaze direction of the driver. For example, the gaze detection sensor may determine a pose of a driver's head, and a position of the driver's eyes. Therefore, the electronic control unit 102 may determine whether the driver has checked one or both sides of the road before attempting to cross an intersection.

The direction of the driver's gaze may be used to determine the perception of the driver. The perception of the driver indicates where or what the driver's attention is focused upon. More specifically, the perception of the driver may indicate whether the driver is paying attention to his or her surroundings (e.g., the intersection). The electronic control unit 102 may determine that semi-autonomous control of one or more vehicle functions is appropriate based on the perception of the driver. More specifically, in response to determining that the driver of the vehicle 100 is distracted or is not paying attention to the intersection, the electronic control unit 102 may determine that semi-autonomous control of the vehicle 100 is appropriate. In addition to the driver's direction of gaze, other information may be used to determine a driver's perception such as, but not limited to, the driver's speech patterns, a position of the driver's seat, and a volume level of the audio system of the vehicle 100.

In addition to the driver's perception, the perception of the vehicle 100 may also be determined. The perception of the vehicle 100 may be determined based on objects located within or around the vicinity of the intersection 200 (FIG. 2) detected by the object detection system 130. More specifically, the perception of the vehicle is based on the information collected by various cameras and sensors of the object detection system 130 to view the surrounding environment (e.g., the intersection) of the vehicle 100. The perception of the vehicle 100 may also be determined based on one more operating conditions of the vehicle 100 detected by the vehicle operating condition sensor system 160.

The electronic control unit 102 may also access a plurality of predetermined behavioral profiles that are each representative of a particular intersection. For example, in the embodiment as shown in FIG. 2 the corresponding behavioral profile indicates the intersection 200 is a four-way intersection. The behavioral profile of a particular intersection may indicate characteristics such as, but not limited to, the specific number and type of road segments, the presence of any traffic signals, weather conditions based on the season, elevational attributes that may affect the driver's ability to view cross-traffic, geographical location, congestion, accident statistics, and the like. The road segments indicate if a particular intersection is a three-way intersection, a four-way intersection, a five-way intersection, a T-junction, Y-junction, and the like.

An intersection may sometimes have traffic signals to manage the flow of vehicles, especially if the intersection is congested on a regular basis. Therefore, various attributes of the traffic signal may also be part of the behavioral profile as well. For example, a traffic signal's cycle time, whether a left turn is protected, and the number of different lights may also be part of the behavioral profile. Another example of an attribute related to traffic signals may include, for example, a listing of the different colored lights. More specifically, some traffic signals include red, yellow, and green lights, and other signals may only include a single light such as, for example, a flashing red light or a flashing yellow light.

The behavioral profile may also indicate the current or predicted weather conditions for a particular intersection. For example, when there is severe weather, ice and snow may accumulate on the road. The accumulation of ice and snow may make the roads slippery and more difficult to navigate. Falling rain, snow, or sleet may also affect visibility as well. In addition to various weather conditions, the behavioral profile may also include elevational attributes of a particular intersection. More specifically, the behavioral profile may indicate if the intersection is located upon an incline thereby making it more challenging for a driver to view cross-traffic. The behavioral profile may also include other elevational information as well, such as altitude and the like.

In an embodiment of the present disclosure, the behavioral profile may also indicate traffic congestion for a particular intersection based on the same of day. For example, an intersection may be very congested during rush hour traffic but is relatively empty at other times. Furthermore, it should be appreciated that the degree or amount of traffic congestion may also be indicated. For example, the traffic congestion may be far more severe in a large metropolitan area such as New York City when compared to a smaller town or a more rural area.

Referring to FIG. 1, in one non-limiting embodiment the behavioral profile may be stored on one or more memory modules 106 of the electronic control unit 102. Alternatively, in another embodiment the behavioral profile may not be stored locally. Instead, the vehicle 100 may provide local wireless communication between the wireless communication system 180 and the network 182. The network 182 may connect to one or more remotely located servers 188 that store data such as the behavioral profiles. As an example and not a limitation, the vehicle 100 may be equipped with a cellular communications device to transmit data to and from the remote server 188. As another non-limiting example, the vehicle 100 may provide local wireless communication between the electronic control unit 102 and a mobile device 192 (e.g., communication between the electronic control unit 102 and a smartphone by a wireless protocol such as BLUETOOTH®) such that the mobile device communicates with the network 182 and the remote server 188. Thus, the electronic control unit 102 may access the behavioral profiles by either accessing the one or more memory modules 106, or by the servers 188, where the vehicle 100 is in wireless communication with the servers 188 by the network 182.

Sometimes a behavioral profile may not be readily available for a particular intersection. In other words, the electronic control unit 102 is unable to access a behavioral profile from either the memory modules 106 or the servers 188. In response to determining there is no behavioral profile available for a particular intersection, the electronic control unit 102 may calculate a substitute behavioral profile based on data pertaining to a plurality of intersections encountered by the vehicle 100 over time. Alternatively, intersections encountered by other vehicles that are in wireless communication with the vehicle 100 may also be used to build the substitute behavioral profile as well. More specifically, machine learning may be used to recognize patterns at intersections based on specific characteristics such as, but not limited to, number of road segments, the presence of any traffic signals, weather conditions based on the season, time of day, and geographical location. For instance, all intersections in a particular geographical area may include one or more specific characteristics in common, and may be considered when determining a substitute behavioral profile.

In one non-limiting example, the electronic control unit 102 may determine based on machine learning that several four-way intersection located in a specific metropolitan area (e.g., the New York-Newark-Jersey City Metropolitan Statistical Area) with only a flashing yellow light tend to be very congested during rush hour traffic. Accordingly, if the vehicle 100 approaches a four-way intersection with a flashing yellow light in the Newark metropolitan area that has no associated behavioral profile, then the electronic control unit 102 may determine that the four-way intersection is likely to be congested during rush hour.

Additionally, in another embodiment, the electronic control unit 102 may access pre-determined situational profiles. More specifically, in response to determining no behavioral profile exists for a particular intersection the electronic control unit 102 may access the pre-determined situational profiles. The situational profiles represent the typical conditions for an intersection having similar characteristics such as, but not limited to, the specific number and type of road segments, the presence of any traffic signals, weather conditions based on the season, elevational attributes that may affect the driver's ability to view cross-traffic, geographical location, congestion, and the like. The electronic control unit 102 may select one of situational profile as a substitute for the behavioral profile.

The electronic control unit 102 may calculate the maneuver to be performed by one or more vehicle systems based at least in part on the perception associated with the driver, the perception of the vehicle, and a risk level associated with the intersection. The risk level indicates a likelihood that the vehicle 100 will contact a detected object in the environment, be driven off of the road, or other undesirable circumstances during manual control (i.e., the vehicle 100 is operated based on human input only). The risk level associated with the intersection is based on the perception of the driver, the perception of the vehicle, the predicted trajectory 212 of the vehicle 100 (FIG. 2), and one or more actions executed by the driver before attempting to maneuver the vehicle 100 through the intersection. Some examples of actions performed by the driver before attempting to cross the intersection that may affect the risk level include, for example, checking the surrounding area of the intersection before attempting to make a turn. More specifically, the electronic control unit 102 may first determine the perception of the driver and the perception of the vehicle, and then determine the predicted trajectory 212 of the vehicle 100 (FIG. 2) through the intersection 200 based on the perception of the driver and the vehicle.

In response to determining there is a high risk level, or that the driver is not focused on the intersection, in one embodiment the electronic control unit 102 may determine that semi-autonomous control of the vehicle is necessary. Specifically, in response to determining that the risk level is above a threshold, then the electronic control unit 102 may determine that one or more vehicle systems such as steering systems, braking systems, or throttle systems of the vehicle 100 should be semi-autonomously controlled. In other words, where there is a strong likelihood that the vehicle 100 will contact a selected object (or other undesirable circumstance) based on a high risk level, the electronic control unit 102 may determine that semi-autonomous control of the vehicle 100 is appropriate.

In one embodiment, the risk level may be assigned a value. For instance, in one example the risk level may be based on a scale of 1 to 5, or a scale of 1 to 10. A risk level of 1 would indicate the smallest amount of risk possible, where the risk increases based on the value. Although specific numerical scales for assigning the risk level are described, it is to be appreciated that these examples are non-limiting in nature. The threshold for the risk level may be based on factors such as, but not limited to, weather, visibility conditions, driver attentiveness, if the driver has checked both sides of the intersection, accident statistics for the particular intersection, the relative congestion of the intersection, road conditions (e.g., snow or ice), and the like.

In one embodiment, the electronic control unit 102 may determine that semi-autonomous control of the vehicle is required based on comparing the risk level with the threshold. In response to determining the risk level is above the threshold, the vehicle 100 may be semi-autonomously controlled based on a planned maneuver. More specifically, the electronic control unit 102 may take semi-autonomous control of the vehicle 100 using the semi-autonomous control system 120 to perform the planned maneuver. The planned maneuver may be based at least in part by the perception of the vehicle and the predicted trajectory 212 of the vehicle 100 (FIG. 2). In an embodiment, the planned maneuver may be based on a maneuver that was unsuccessfully attempted by the driver. However, unlike the maneuver that was attempted by the driver, the planned maneuver may be completed successfully.

Alternatively or in addition to semi-autonomous control of one or more vehicle systems, the electronic control unit 102 may also provide instructions to the driver. The instructions may be conveyed to the driver by the notification device 152, and indicate how the vehicle 100 is to be maneuvered though the intersection. The notification may be an audio, visual, and/or haptic message. The notification may indicate an appropriate time to make a turn through the intersection.

In one embodiment, the notification may also provide specific details as to how the turn should be performed as well. More specifically, the notification may indicate the speed at which the maneuver should be performed (e.g., "turn left quickly now") or may provide one or more warnings to the driver. For instance, the notification may inform the driver of a nearby obstacle, or if the driver not maneuvering the vehicle 100 properly. For example, the notification may inform the driver to watch out for a pedestrian (e.g., "watch out for a woman at two o'clock", or "watch out for the black dog running through the street"). Alternatively, the notification may also inform the driver that he or she may be steering the vehicle 100 in such a manner that the vehicle 100 may veer off the road (e.g., "your turn is too wide and you will contact the guard rail").

Referring to both FIGS. 1 and 2, the electronic control unit 102 may determine that the object detection system 130 is unable to view a portion of the environment surrounding of the vehicle 100 based on the perception of the vehicle 100. For instance, the vehicle 100 shown in FIG. 2 is unable to view the right-hand side of the intersection due to the occlusion 214 (i.e., the shrubbery). More specifically, the electronic control unit 102 may determine that the vehicle is positioned too far back from the intersection in order to clearly view the right-hand side of the intersection, as the shrubbery 210 is blocking the view of the object detection system 130.

In response to determining the object detection system 130 is unable to view a portion of the environment surrounding the vehicle 100, in one embodiment the electronic control unit 102 may instruct one or more vehicle system to perform an initial maneuver. The initial maneuver is performed before the vehicle 100 actually turns through the intersection, and positions the vehicle in another location where the environment surrounding the vehicle 100 is substantially visible.

In one embodiment, the initial maneuver may include controlling one or more vehicle systems (e.g., the throttle control system) to move the vehicle 100 further into the intersection. More specifically, the throttle control system may nudge or push the vehicle by a relatively short distance into the intersection. Accordingly, cameras or other sensors may now view the cross-traffic through the intersection in order to determine an appropriate time to make the maneuver. Although the present embodiment describes nudging the vehicle 100 further into the intersection 200, it should be appreciated that this example is non-limiting in nature. In another embodiment, the vehicle 100 may be positioned further to the left, the right, backwards, or in any other direction so that the object detection system 130 may view the entire environment surrounding the intersection.

In still another embodiment, the semi-autonomous control system 120 may take over control of the vehicle 100 in the event the driver is not maneuvering the vehicle 100 through the intersection correctly, or in response to determining at least one changed condition by the electronic control unit 102. More specifically, the changed condition may be determined based on at least one of the output signal generated by the object detection system 130, the operational signal generated by the vehicle operating condition sensor system 160, and the direction of the driver's gaze detected by the driver detection system 170. Some examples of changed conditions include, but are not limited to, an obstacle suddenly entering the intersection, an object proximate to the intersection moving unexpectedly to create an obstacle, unexpected actions that may create driver distraction, and the like. The driver may become distracted due to a number of reasons. For instance, a passenger such as a child may jump or scream while the driver is attempting to turn.

In response to determining at least one changed condition, the electronic control unit 102 may alter the predicted trajectory 212 (FIG. 2) of the vehicle 100 by semi-autonomously controlling one or more vehicle systems. For example, if another vehicle or passenger unexpectedly enters into the intersection such that the driver is unable to steer the vehicle 100 away from the obstruction, then the semi-autonomous control system 120 may take control of the vehicle 100.

Figure 3:
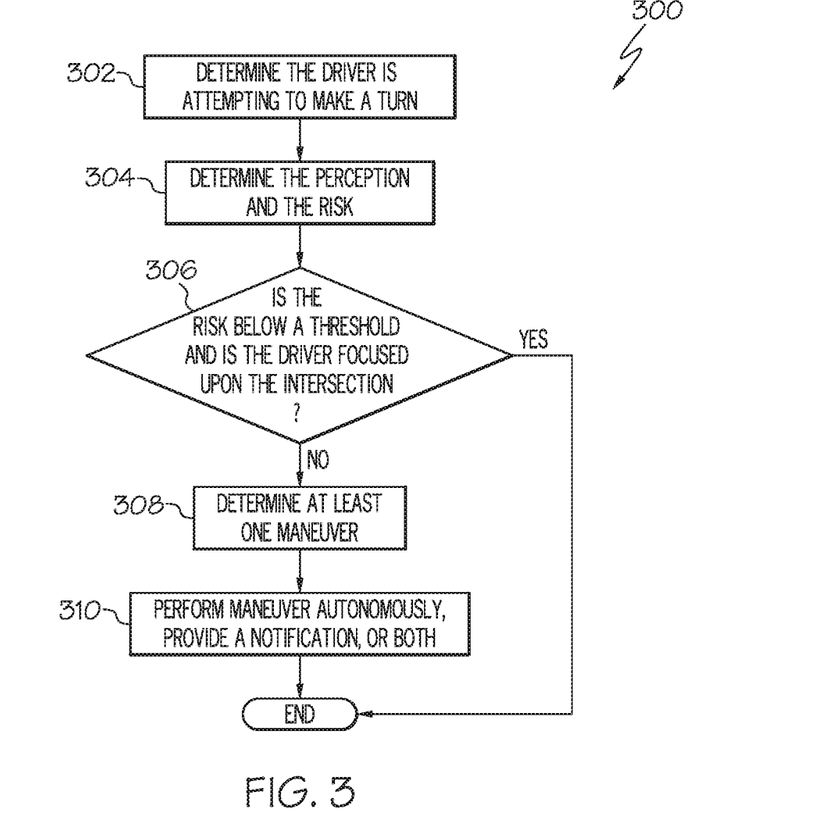
FIG. 3 depicts a flowchart of an example method for assisting a driver of the vehicle shown in FIG. 1 attempting to turn through an intersection, according to one or more embodiments shown and described herein.

Referring now to FIG. 3, a flowchart 300 depicting a method for assisting a driver attempting to make a turn at an intersection based on the level of risk and perception is disclosed. It should be understood that embodiments are not limited by the order of steps of the flowchart 300 of FIG. 3.

Referring generally to FIGS. 1, 2, and 3, in block 302 of the flowchart 300 the electronic control unit 102 receives a signal from at least one of the driver detection system 170, the location determination system 140, and the vehicle operating condition sensor system 160 indicating the driver is attempting to make a turn at an intersection. Specifically, the driver detection system 170 may send the gaze signal indicating the driver's gaze pattern. If the driver's gaze pattern indicates the driver is looking left and right through the intersection in order to determine the cross-traffic, then this may be an indication that the driver is attempting to make a turn.

In another embodiment, the driver determination system 170 may send signals indicating the driver is about to make a turn at an intersection. The map data may indicate the vehicle 100 is approaching a T-junction, Y-junction, or any other intersection where a driver needs to turn. In still another embodiment, the vehicle operating condition sensor system 160 may output an operational signal indicative of the steering wheel and/or activation of one of the turn signal blinkers. More specifically, the position of the steering wheel may indicate that the driver is attempting to make a turn at an intersection. Furthermore, many drivers activate one of the turn signal blinkers when attempting to make a turn. Once the electronic control unit 102 determines that the driver of the vehicle 100 is attempting to make a turn at an intersection, then the method may proceed to block 304.

In block 304, the electronic control unit 102 may then determine the perception of the driver, the perception of the vehicle 100, and the risk associated with the intersection. As mentioned above, the perception of the driver indicates where or what the driver's attention is focused upon. The risk level associated with the intersection is based on the perception of the driver, the perception of the vehicle, the predicted trajectory 212 of the vehicle 100 (FIG. 2), and one or more actions executed by the driver before attempting to maneuver the vehicle 100 through the intersection by manual control. Once the perception of the driver, the perception of the vehicle, and the risk level of the intersection are determined, the method may proceed to decision block 306.

In decision block 306, the electronic control unit 102 determines if the risk level exceeds the threshold or if the driver is distracted and is not paying attention to the intersection based on the perception associated with the driver. In response to determining the risk level exceeds the threshold or that the driver is distracted, the method may then proceed to block 308.

In block 308, the electronic control module 102 may calculate one or more maneuvers based on the perception of the driver, the perception of the vehicle, and the risk level. The method may then proceed to block 310. In block 310, one or more vehicle systems such as steering systems, braking systems, or throttle systems of the vehicle 100 are semi-autonomously controlled to guide the vehicle 100 through the intersection based on the one or more maneuvers. Alternatively or in addition to semi-autonomous control of one or more vehicle systems, the electronic control unit 102 may also provide instructions to the driver as to how the vehicle 100 is to be maneuvered though the intersection by the notification device 152.

Referring back to block 306, in response to determining the risk level is below the threshold and that the driver is attentive, then the electronic control unit 102 may determine that semi-autonomous control of the vehicle 100 is not required. In other words, the driver may maneuver the vehicle 100 through the intersection without assistance. This is because the focus of the driver is directed towards the intersection, and the risk of contact with another vehicle or other undesirable outcome is relatively low. In other words, the electronic control module 102 has determined the driver will likely be able to turn through the intersection on his or her own, and no assistance is required. Accordingly, the method may then terminate without taking further action.

It should now be understood that embodiments described herein are directed to vehicle systems for providing assistance to a driver attempting to make a turn at an intersection. More specifically, the disclosed system may semi-autonomously perform one or more maneuvers to turn the vehicle through the intersection, provide one or more indicators to the driver that provide instructions related to the intersection, or both. Accordingly, the disclosed system may reduce the number of unwanted incidents from occurring as the vehicle navigates through an intersection. Additionally, the disclosed system may also provide guidance to drivers that are inexperienced, have limited skill, or who are timid when attempting to make a turn. This may be especially useful at busy intersections that are commonly found in metropolitan areas.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle, comprising:
   a plurality of sensors configured to output a plurality of operational signals;
   one or more processors; and
   one or more non-transitory memory modules communicatively coupled to the one or more processors and storing machine-readable instructions that, when executed, cause the one or more processors to perform at least the following:
      receive a signal indicating a driver of the vehicle is attempting to make a turn at an intersection;
      access a behavioral profile among a plurality of behavior profiles that is representative of the intersection;
      develop a perception as well as a risk associated with the intersection based on the plurality of operational signals from the plurality of sensors and the behavioral profile of the intersection; and
      calculate at least one maneuver to be performed by one or more vehicle systems of the vehicle based at least in part on at least the perception and the risk of the intersection.

2. The vehicle of claim 1, wherein the vehicle further comprises:
   a notification system configured to produce one or more indicators, wherein the machine-readable instructions further cause the one or more processors to:
      in response to calculating the at least one maneuver, generate the one or more indicators by the notification system, wherein the one or more indicators provide instructions to the driver related to the at least one maneuver.

3. The vehicle of claim 1, wherein the machine-readable instructions further cause the one or more processors to:
   predict a trajectory of the vehicle through the intersection;
   autonomously control the vehicle based on the at least one maneuver through a portion of the intersection; and
   in response to determining at least one changed condition based on the plurality of operational signals from the plurality of sensors, alter the trajectory of the vehicle.

4. The vehicle of claim 3, wherein the at least one changed condition includes at least one of an obstacle entering the intersection, an object proximate to the intersection moving to create the obstacle, and an action that distracts the driver.

5. The vehicle of claim 1, further comprising:
   a driver detection system configured to output a gaze signal indicative of a gaze direction of the driver;
   an object detection system configured to output an output signal indicative of one or more objects within a vicinity of the vehicle; and
   a vehicle operating condition sensor system configured to output an operational signal indicative of one or more operating conditions of the vehicle, wherein the machine-readable instructions further cause the one or more processors to:
      determine a perception of the driver based on at least the gaze direction of the driver; and
      determine a perception of the vehicle based on at least the one or more objects within the vicinity of the vehicle and the one or more operating conditions of the vehicle.

6. The vehicle of claim 5, wherein the machine-readable instructions further cause the one or more processors to: determine that the object detection system is unable to view a portion of an environment surrounding the vehicle based on the perception of the vehicle; and in response to determining the object detection system is unable to view the portion of the environment surrounding the vehicle, instruct the one or more vehicle systems to perform an initial maneuver performed before the vehicle turns through the intersection.

7. The vehicle of claim 5, wherein the machine-readable instructions further cause the one or more processors to:
determine a risk level associated with the intersection based on the perception of the driver, the perception of the vehicle, and a predicted trajectory of the vehicle through the intersection; and
in response to determining at least one of the following, the at least one maneuver is performed by the one or more vehicle systems:
the risk level exceeds a threshold;
the driver is distracted based on the perception of the driver; and
the object detection system is unable to view at least a portion of an environment surrounding the vehicle based on the perception of the vehicle.

8. The vehicle of claim 1, wherein the machine-readable instructions determine the vehicle is attempting to make the turn based on at least one of an activation of a turn signal, a direction of a driver's gaze, a position of a steering wheel, and map data.

9. The vehicle of claim 1, wherein the machine-readable instructions further cause the one or more processors to:
access the behavioral profile by either the one or more memory modules or by one or more servers, wherein the vehicle is in wireless communication with the one or more servers by a network.

10. The vehicle of claim 1, wherein the machine-readable instructions further cause the one or more processors to:
access the one or more memory modules and one or more servers in wireless communication with the vehicle in order to locate the behavioral profile; and
in response to determining no behavioral profile exists for the intersection in the one or more memory modules and the one or more servers, calculate a substitute behavioral profile based on data pertaining to a plurality of intersections.

11. The vehicle of claim 1, wherein the behavioral profile representative of the intersection indicates one or more of a specific number and type of road segments, a presence of any traffic signals, weather conditions based on season, elevational attributes, geographical location, and congestion.

12. A method, comprising:
receiving a signal indicating a driver of a vehicle is attempting to make a turn at an intersection;
accessing, by a computer, a behavioral profile among a plurality of behavior profiles that is representative of the intersection;
developing a perception as well as a risk associated with the intersection based on a plurality of operational signals from a plurality of sensors and the behavioral profile of the intersection; and
calculating at least one maneuver to be performed by one or more vehicle systems of the vehicle based at least in part on at least one of the perception and the risk of the intersection.

13. The method of claim 12, further comprising:
in response to calculating the at least one maneuver, generating one or more indicators by a notification system, wherein the one or more indicators provide instructions to the driver related to the at least one maneuver.

14. The method of claim 12, further comprising:
predicting a trajectory of the vehicle through the intersection;
autonomously controlling the vehicle based on the at least one maneuver through a portion of the intersection;
detecting at least one changed condition based on the plurality of operational signals from the plurality of sensors; and
in response to determining the at least one changed condition, alter the trajectory of the vehicle.

15. The method of claim 14, wherein the at least one changed condition includes at least one of an obstacle entering the intersection, an object proximate to the intersection moving to create the obstacle, and an action that distracts the driver.

16. The method of claim 12, further comprising:
receiving a gaze signal indicative of a gaze direction of the driver from a driver detection system;
determining a perception of the driver based on at least the gaze direction of the driver;
receiving an output signal indicative of one or more objects within a vicinity of the vehicle from an object detection system; and
determining a perception of the vehicle based on at least the one or more objects within the vicinity of the vehicle and one or more operating conditions of the vehicle.

17. The method of claim 16, further comprising:
determining that the object detection system is unable to view a portion of an environment surrounding the vehicle based on the perception of the vehicle; and
in response to determining the object detection system is unable to view the portion of the environment surrounding the vehicle, instructing the one or more vehicle systems to perform an initial maneuver performed before the vehicle turns through the intersection.

18. The method of claim 16, further comprising:
determining a risk level associated with the intersection based on the perception of the driver, the perception of the vehicle, and a predicted trajectory of the vehicle through the intersection; and
in response to determining at least one of the following, performing the at least one maneuver by the one or more vehicle systems:
the risk level exceeds a threshold;
the driver is distracted based on the perception of the driver; and
the object detection system is unable to view at least a portion of an environment surrounding the vehicle based on the perception of the vehicle.

19. The method of claim 12, further comprising:
determining the vehicle is attempting to make the turn based on at least one of an activation of a turn signal, a direction of a driver's gaze, a position of a steering wheel, and map data.

20. The method of claim 12, further comprising:
accessing the behavioral profile by either the one or more memory modules or by one or more servers, wherein the vehicle is in wireless communication with the one or more servers by a network.

* * * * *

UNITED STATES PATENT AND TRADEMARK OFFICE
CERTIFICATE OF CORRECTION

PATENT NO. : 10,752,249 B2
APPLICATION NO. : 15/921027
DATED : August 25, 2020
INVENTOR(S) : John J. Leonard, Stephen G. McGill and Luke S. Fletcher Page 1 of 1

It is certified that error appears in the above-identified patent and that said Letters Patent is hereby corrected as shown below:

In the Specification

In Column 1, Line(s) 51, delete "perception" and insert --perceptions--, therefor.

In Column 1, Line(s) 64, delete "perception" and insert --perceptions--, therefor.

In Column 3, Line(s) 33 & 34, before "the driver detection system 170", delete "at least one of".

In Column 12, Line(s) 45, before "the driver detection system 170", delete "at least one of".

In the Claims

In Column 14, Line(s) 48, Claim 4 delete "obstacle" and insert --obstacles--, therefor.

In Column 15, Line(s) 66, Claim 12 delete "perception" and insert --perceptions--, therefor.

In Column 16, Line(s) 18, Claim 15 delete "obstacle" and insert --obstacles--, therefor.

Signed and Sealed this
Third Day of November, 2020

Andrei Iancu
*Director of the United States Patent and Trademark Office*